Patented June 12, 1934

1,962,140

UNITED STATES PATENT OFFICE 1,962,140

MANUFACTURE OF HYDROXY CARBOXYLIC ACIDS

Henry Dreyfus, London, England

No Drawing. Application March 21, 1929, Serial No. 348,979. In Great Britain April 18, 1928

15 Claims. (Cl. 260—112)

This invention relates to the manufacture of hydroxy aliphatic carboxylic acids.

According to the present invention hydroxy aliphatic carboxylic acids are obtained by catalytic hydrogenation of aliphatic polycarboxylic acids, for example oxalic acid, or acid salts thereof, for example the mono alkali metal salts of oxalic acid.

The hydrogenation may be carried out under pressure or at atmospheric pressure and pure hydrogen or gases containing hydrogen with or without carbon monoxide, for example water gas, town gas, producer gas or the like, may be employed. The reduction may be conducted in presence of any suitable hydrogenation catalyst, for example, nickel, copper, platinum, palladium, cobalt or iron, and may, if desired, be effected in presence of a solvent or inert diluent for the acid or salt treated.

The reaction may, for example, be carried out as follows:—

An aqueous solution of potassium hydrogen oxalate is charged into a copper lined autoclave fitted with a stirrer. A powdered nickel catalyst obtained by reduction of nickel carbonate by hydrogen is added and hydrogen introduced under pressure, the reaction being continued until no more hydrogen is absorbed. The potassium glycollate is separated in known manner.

In a similar manner oxalic acid itself or other salts of oxalic acid or malonic acid, succinic acid, or other polycarboxylic acids or salts thereof may be reduced to the corresponding hydroxy aliphatic acids.

If desired, the hydroxy aliphatic carboxylic acids thus obtained may be converted into ethers by treatment with a methylating or other etherifying agent or into esters by treatment with esterifying agents, for example acetic anhydride.

What I claim and desire to secure by Letters Patent is:—

1. Process for the production of hydroxy aliphatic carboxylic acids or their salts, comprising subjecting to catalytic hydrogenation saturated aliphatic compounds of the general formula RCOOX where R contains a free carboxyl group and X is hydrogen or a metal.

2. Process for the production of hydroxy aliphatic carboxylic acids or their salts, comprising subjecting to catalytic hydrogenation in the presence of a nickel catalyst, saturated aliphatic compounds of the general formula RCOOX where R contains a free carboxyl group and X is hydrogen or a metal.

3. Process for the production of hydroxy aliphatic carboxylic acids or their salts, comprising subjecting saturated aliphatic compounds of the general formula RCOOX, where R contains a free carboxylic group and X is hydrogen or a metal, to catalytic hydrogenation in an inert liquid medium.

4. Process for the production of hydroxy aliphatic acids or their salts, comprising subjecting saturated aliphatic compounds of the general formula RCOOX, where R contains a free carboxylic group and X is hydrogen or a metal, to catalytic hydrogenation in the liquid phase.

5. Process for the production of hydroxy aliphatic carboxylic acids or their salts, comprising subjecting saturated aliphatic compounds of the general formula RCOOX, where R contains a free carboxylic group and X is hydrogen or a metal, to catalytic hydrogenation in an inert liquid medium and in the presence of a nickel catalyst.

6. Process for the production of hydroxy aliphatic carboxylic acids or their salts, comprising subjecting to catalytic hydrogenation a solution of a saturated aliphatic compound of the general formula RCOOX, where R contains a free carboxylic group and X is hydrogen or a metal.

7. Process for the production of glycollic acid or its salt comprising subjecting to catalytic hydrogenation a compound of the type

where X is hydrogen or a metal.

8. Process for the production of glycollic acid or its salt, comprising subjecting to catalytic hydrogenation in presence of a nickel catalyst, a compound of the type

where X is hydrogen or a metal.

9. Process for the production of glycollic acid or its salt, comprising subjecting to catalytic hydrogenation in presence of an inert medium, a compound of the type

where X is hydrogen or a metal.

10. Process for the production of glycollic acid or its salt, comprising subjecting to catalytic hydrogenation in presence of a nickel catalyst and an inert medium, a compound of the type

where X is hydrogen or a metal.

11. Process for the production of glycollic acid or its salt, comprising subjecting to catalytic hydrogenation a solution of a compound of the type

where X is hydrogen or a metal.

12. Process for the production of glycollic acid or its salt, comprising subjecting to catalytic hydrogenation an aqueous solution of potassium hydrogen oxalate.

13. Process for the production of salts of hydroxy aliphatic carboxylic acids, comprising subjecting an acid salt of an aliphatic polycarboxylic acid to catalytic hydrogenation.

14. Process for the production of salts of hydroxy aliphatic carboxylic acids, comprising subjecting an acid salt of an aliphatic polycarboxylic acid to catalytic hydrogenation in the presence of a nickel catalyst.

15. Process for the production of metallic glycollates comprising subjecting an acid salt of oxalic acid to catalytic hydrogenation.

HENRY DREYFUS.